(12) United States Patent
Wang et al.

(10) Patent No.: US 11,379,081 B2
(45) Date of Patent: Jul. 5, 2022

(54) TOUCH SYSTEM AND METHOD OF OPERATING THE SAME

(71) Applicant: DYNASCAN TECHNOLOGY CORP., Taoyuan (TW)

(72) Inventors: Tsun-I Wang, Taoyuan (TW); Ching-Chun Wu, Taoyuan (TW); Chih-Chin Hsu, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 16/995,508

(22) Filed: Aug. 17, 2020

(65) Prior Publication Data

US 2022/0050539 A1 Feb. 17, 2022

(51) Int. Cl.
*G06F 3/042* (2006.01)
*G06F 3/041* (2006.01)

(52) U.S. Cl.
CPC ............ *G06F 3/042* (2013.01); *G06F 3/0416* (2013.01)

(58) Field of Classification Search
USPC ........................................................ 345/175
See application file for complete search history.

(56) References Cited

U.S. PATENT DOCUMENTS

| 2008/0074401 | A1* | 3/2008 | Chung | G02F 1/1368 345/175 |
| 2008/0150890 | A1* | 6/2008 | Bell | G06F 3/0425 345/156 |
| 2009/0021487 | A1* | 1/2009 | Tien | G06F 3/041 345/173 |
| 2009/0027358 | A1* | 1/2009 | Hosono | G06F 3/0421 345/175 |
| 2009/0128508 | A1* | 5/2009 | Sohn | G06F 3/0421 345/173 |
| 2010/0060611 | A1* | 3/2010 | Nie | G06F 3/0421 345/175 |
| 2010/0259492 | A1* | 10/2010 | Chang | G06F 3/0425 345/173 |
| 2010/0289755 | A1* | 11/2010 | Zhu | G06F 3/042 345/173 |
| 2010/0302196 | A1* | 12/2010 | Han | G06F 3/0425 345/173 |

(Continued)

*Primary Examiner* — Chineyere D Wills-Burns
(74) *Attorney, Agent, or Firm* — Duane Morris LLP (57) ABSTRACT

The present disclosure provides a touch system. The touch system includes a window glass having a touch area and a display apparatus spaced apart from the window glass and having a display area corresponding to the touch area of the window glass. A plurality of subareas are defined on the touch area. The display apparatus includes a planar invisible light source configured to emit a first invisible light toward the touch area of the window glass. The touch system further includes a camera device configured to detect a second invisible light reflected from a subarea of the plurality of subareas. The touch system further includes a processor electrically connected to the camera device and configured to retrieve an electrical information of the detected second invisible light. If the electrical information of the detected second invisible light exceeds a threshold, the processor determines that a position on the display area corresponding to the subarea of the plurality of subareas is touched. A method of operating a touch system is also provided.

15 Claims, 9 Drawing Sheets

(56) References Cited

U.S. PATENT DOCUMENTS

| | | | |
|---|---|---|---|
| 2011/0199338 A1* | 8/2011 | Kim | G06F 3/042 |
| | | | 345/175 |
| 2012/0162138 A1* | 6/2012 | Lee | G06F 3/042 |
| | | | 345/175 |
| 2014/0313140 A1* | 10/2014 | Imine | G06F 1/1626 |
| | | | 345/173 |
| 2015/0022459 A1* | 1/2015 | Yliaho | G06F 3/0416 |
| | | | 345/173 |
| 2015/0253931 A1* | 9/2015 | Wyrwas | G06F 3/0421 |
| | | | 345/175 |
| 2015/0324064 A1* | 11/2015 | Yi | G06F 3/041661 |
| | | | 345/175 |
| 2016/0132185 A1* | 5/2016 | Otsubo | G06F 3/0425 |
| | | | 345/175 |
| 2017/0337413 A1* | 11/2017 | Bhat | G06V 40/1318 |

* cited by examiner

TOUCH SYSTEM AND METHOD OF OPERATING THE SAME

BACKGROUND

1. Technical Field

The present disclosure generally relates to a touch system and method of operating the touch system.

2. Description of the Related Art

An interactive display is widely used in different occasions. A touch film may be provided on the front side (such as a display thereof) of the computer terminal for implementing touch detection ability. However, the conventional touch display with large size may be expensive and fragile.

SUMMARY

In one or more embodiments, the present disclosure provides a touch system. The touch system includes a window glass having a touch area and a display apparatus spaced apart from the window glass and having a display area corresponding to the touch area of the window glass. A plurality of subareas are defined on the touch area. The display apparatus includes a planar invisible light source configured to emit a first invisible light toward the touch area of the window glass. The touch system further includes a camera device configured to detect a second invisible light reflected from a subarea of the plurality of subareas. The touch system further includes a processor electrically connected to the camera device and configured to retrieve an electrical information of the detected second invisible light. If the electrical information of the detected second invisible light exceeds a threshold, the processor determines that a position on the display area corresponding to the subarea of the plurality of subareas is touched.

In one or more embodiments, the present disclosure provides the present disclosure provides a touch system. The touch system includes a window glass and a display apparatus spaced apart from the window glass. The display apparatus includes an invisible light source configured to emit an invisible light toward the window glass. The touch system further includes a camera device configured to capture one or more optical information of the window glass and a processor electrically connected to the camera device. The processor is configured to determine whether a first position on the window glass corresponding to a second position on the display apparatus is touched based on the one or more optical information of the window glass. The first position on the window glass is space apart from the second position on the display apparatus.

In one or more embodiments, the present disclosure provides a method of operating a touch system. The method includes dividing an area of a window glass into a plurality of subareas. The method further includes capturing one or more optical information of the window glass and determining a corresponding position on a display apparatus based on the one or more optical information of the window glass.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

The following disclosure provides for many different embodiments, or examples, for implementing different features of the provided subject matter. Specific examples of components and arrangements are described below. These are, of course, merely examples and are not intended to be limiting. The present disclosure may repeat reference numerals and/or letters in the various examples. This repetition is for simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

Figure 1:
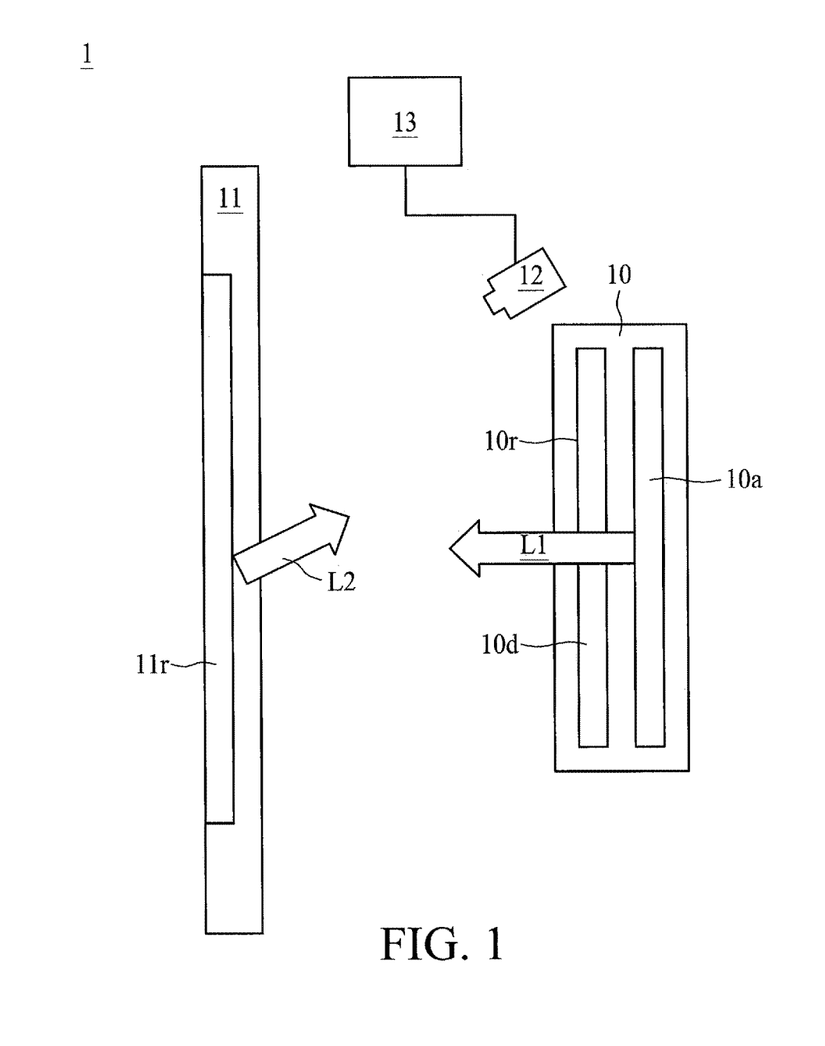
FIG. 1 is a cross-sectional view of a touch system, in accordance with an embodiment of the present disclosure.

FIG. 1 is a cross-sectional view of a touch system 1, in accordance with an embodiment of the present disclosure.

Referring to FIG. 1, the touch system 1 includes a display apparatus 10, a window glass 11, a camera device 12, and a processor 13.

As shown in FIG. 1, the window glass 11 has two sides (e.g., the left side and right side, not labeled in the figures), and the display apparatus 10, the camera device 12, and the processor 13 may be disposed or arranged on the same side (e.g., the right side) of the window glass 11. In some embodiments, the window glass 11 may protect the display apparatus 10, the camera device 12, and the processor 13 from water and dust.

The window glass 11 is spaced apart from the display apparatus 10. In other words, the window glass 11 is not in contact with the display apparatus 10.

The camera device 12 may be arranged external to the display apparatus 10. In some other embodiments, the camera device 12 may be arranged on the display apparatus 10. For example, the camera device 12 may be arranged on a frame of the display apparatus 10. The camera device 12 is arranged to face the window glass 11.

The processor 13 may be arranged external to the display apparatus 10. In some other embodiments, the processor 13 may be arranged on the display apparatus 10. For example, the processor 13 is arranged on a frame of the display apparatus 10. The processor 13 is electrically connected to the camera device 12. In some embodiments, the arrangement of the components of the touch system 1 may be adjusted according to design requirements and is not limited to the specific embodiments illustrated in the figures.

In addition, the system and the method in the present disclosure may be applied to any computer terminal (e.g., any interactive kiosk or any digital signage) and may be integrated with any shop window (or display window, or store window).

For example, in some embodiments, the touch system 1 may include a digital signage. For example, the digital signage, the camera device 12, and the processor 13 may be disposed in an inner side of an enclosure (not shown in the figures), and the window glass 11 may be a side (or a part of a side) of the enclosure. A user may touch the window glass 11 to interact with the touch system 1.

In some embodiments, the touch system 1 may be integrated with a shop window. For example, the window glass 11 may be a part of a shop window, and the display apparatus 10, the camera device 12, and the processor 13 may be disposed on the inner side of the window glass 11. A user may touch the window glass 11 of the shop window to interact with the touch system 1.

Still referring to FIG. 1, the display apparatus 10 includes a screen 10d and a light source 10a. The screen 10d has a display area 10r. In some embodiments, the display area 10r is configured to show contents (e.g., user interface (UI)) of the display apparatus 10. In some embodiments, the display area 10r may be defined as an area that shows contents of the display apparatus 10. In some embodiments, the whole surface of the screen 10d can be the display area 10r. For example, the contents of the display apparatus 10 may be shown on the whole surface of the screen 10d.

The screen 10d may be arranged in front of the light source 10a such that the light source 10a can emit electromagnetic (EM) radiation toward the screen 10d and the window glass 11. In some embodiments, the described EM radiation may include, for example but not limited thereto, invisible light (such as radio waves, microwaves, infrared radiation (IR)) and/or visible light.

For example, the light source 10a may emit visible light (not shown in the figures) toward the screen 10d and create contents shown on the screen 10d. The visible light may pass through the window glass 11 and a user may see contents shown on the screen 10d through the window glass 11.

For example, the light source 10a may emit invisible light (annotated as "L1" in FIG. 1) passing through the screen 10d toward the window glass 11. The invisible light L1 may be reflected as the invisible light L2. In some embodiments, the invisible light L2 may create a relatively bright spot on the window glass 11, which will be further described later with respect to FIG. 4A and FIG. 4B.

In some embodiments, the display apparatus 10 may include, for example but not limited thereto, a liquid crystal display (LCD), a light emitting diode (LED), or an organic light emitting device (OLED). In some embodiments, the light source 10a may include, for example but not limited thereto, a backlight, a planar invisible light source, one or more invisible light sources, or the combination thereof.

Figure 2:
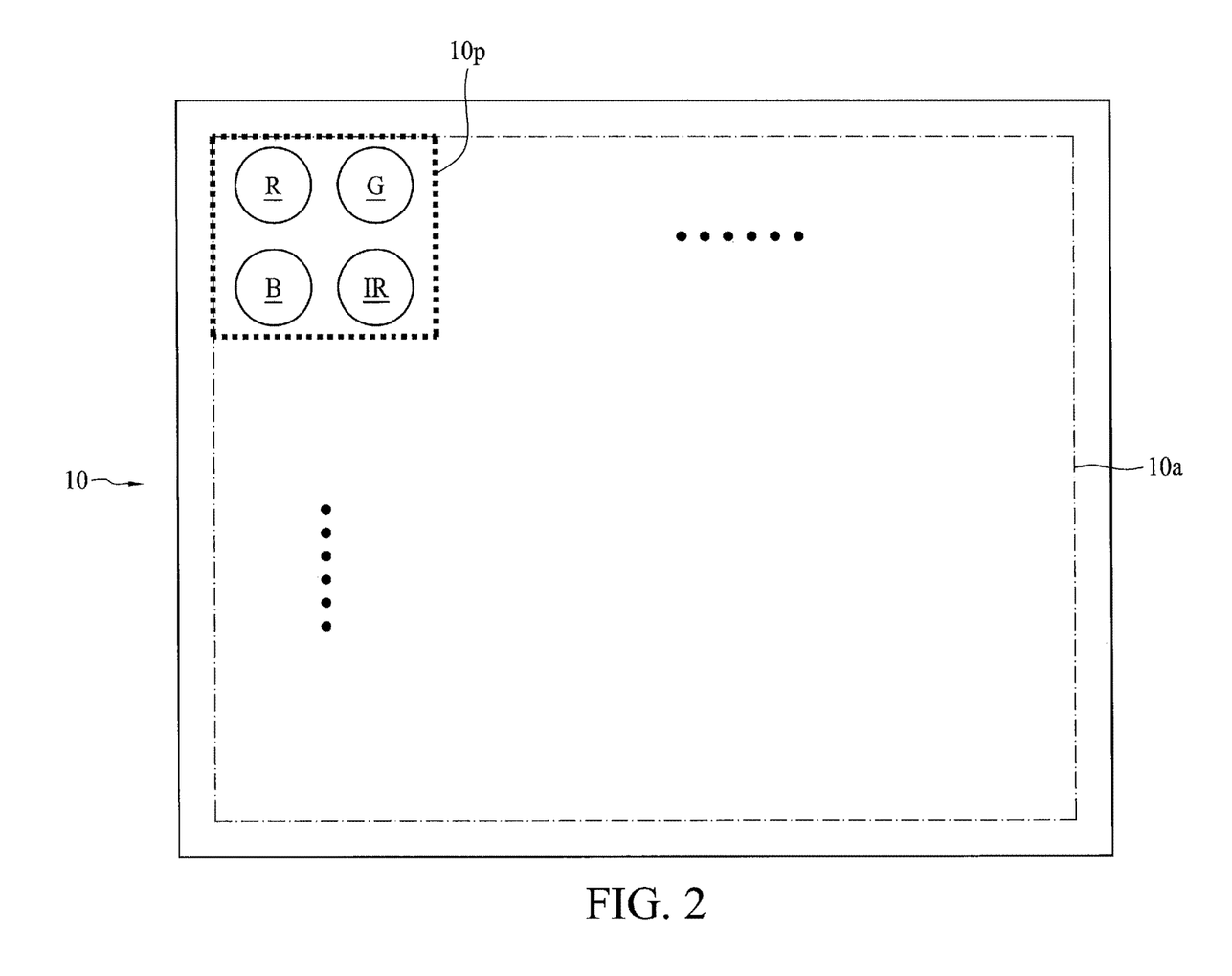
FIG. 2 is a top view of a display apparatus, in accordance with an embodiment of the present disclosure.

Please refer to FIG. 2. FIG. 2 is a top view of a display apparatus 10, in accordance with an embodiment of the present disclosure. In some embodiments, the light source 10a in FIG. 2 may be a planar invisible light source. In some embodiments, the light source 10a in FIG. 2 may be a planar invisible light source integrated with a backlight of a LCD.

For example, the light source 10a includes a plurality of light emitting pixels (or subareas) 10p, and each light emitting pixel 10p further includes several sub-pixels arranged as a cluster.

In some embodiments, the sub-pixels may be light emitting elements physically separated from each other in a cluster. For example, each light emitting pixel 10p of the light source 10a includes sub-pixels "R," "G," "B," and "IR."

In some embodiments, the sub-pixels "R," "G," and "B" may be designed to emit visible light with different wavelengths. In some embodiments, the visible light with different wavelengths of the sub-pixels "R," "G," and "B" in each light emitting pixel 10p may be convergent and may include one single color as viewed by the user.

The light emitting pixels 10p emit light toward the display area 10r, so as to generate contents on the display area 10r as viewed by the user. Therefore, although the light emitting pixels 10p exist on the layer of the light source 10a (but not physically exist on the layer of the display area 10r), the display area 10r may show (and thus referred to as "include" in the present disclosure) the light emitting pixels 10p.

On the other hand, in some embodiments, the sub-pixel "IR" may be designed to emit invisible light. In some embodiments, each light emitting pixel 10p of the light source 10a may include one or more sub-pixel "IR" such that the invisible light is emitted as a planar invisible light toward the window glass 11.

In other words, a plurality of invisible light sources (e.g., the sub-pixel "IR") are arranged across the light source 10a. For example, several invisible light beams are emitted from the light source 10a toward the window glass (such as the window glass 11 in FIG. 1).

In some embodiments, the more the invisible light sources are, the higher the accuracy for detecting user's touch is. In some embodiments, the display apparatus 10 may have any numbers of the sub-pixel "IR" according to design requirements and is not limited to the specific embodiments illustrated in the figures. For example, the number of the sub-pixel "IR" can be N, and N is an integer greater than 1. In addition, the location of the sub-pixel "IR" on the light source 10a may be adjusted according to design requirements and is not limited to the specific embodiments illustrated in the figures.

Figure 3:
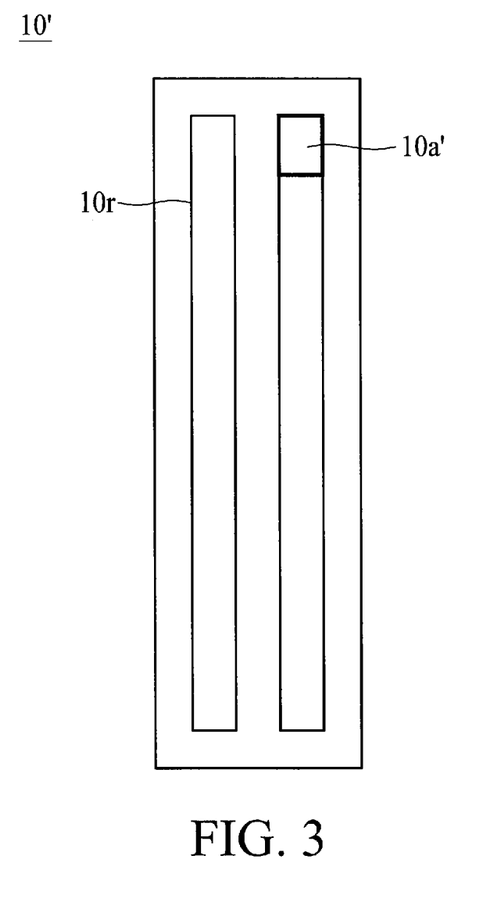
FIG. 3 is a cross-sectional view of a display apparatus, in accordance with an embodiment of the present disclosure.

For another example, referring to FIG. 3, FIG. 3 is a cross-sectional view of a display apparatus 10', in accordance with an embodiment of the present disclosure. In some embodiments, the display apparatus 10 in FIG. 1 can be replaced with the display apparatus 10' in FIG. 3.

The display apparatus 10' includes a light source 10a', which is designed to emit invisible light. One of the differences between the light source 10a' in FIG. 3 and the light source 10a in FIG. 2 is that the light source 10a' in FIG. 3 may be an invisible light source physically attached or mounted to a backlight of a LCD or a LED or an invisible light source physically attached or mounted to a light guide of a LCD or a OLED. For example, the light source 10a' (which emits invisible light) is not integrated with light emitting elements for emitting visible light (e.g., the sub-pixels "R," "G," "B,"). In some embodiments, the light source 10*a*' may be mounted to or be dismounted from the display apparatus 10' as desired.

In some embodiments, the light source 10*a*' may be arranged on the peripheral of the backlight. In some embodiments, the light source 10*a*' may be arranged on the peripheral of the display area 10*r*. In some embodiments, the light source 10*a*' may be arranged on the peripheral of the display apparatus 10'.

In some embodiments, the display apparatus 10' may have any numbers of the light source 10*a*' according to design requirements and is not limited to the specific embodiments illustrated in the figures. For example, the number of the light source 10*a*' can be N, and N is an integer greater than 1. In addition, the location of the light source 10*a*' may be adjusted according to design requirements and is not limited to the specific embodiments illustrated in the figures.

Referring back to FIG. 1, in some embodiments, the window glass 11 may include silicate glasses. In some embodiments, the window glass 11 may include silicon dioxide, quartz, or other suitable materials. In some embodiments, the window glass 11 may be coated with an anti-reflective coating, an anti-glare coating, an anti-ultraviolet (anti-UV) coating, and/or other coatings providing protection from the water and dust.

In some embodiments, the window glass 11 may be transparent to EM radiation, including invisible light and visible light.

The window glass 11 has a touch area 11*r*. In some embodiments, the touch area 11*r* may be configured to receive a user's touch. In some embodiments, the touch area 11*r* may be defined as an area that receives a user's touch. In some embodiments, the whole surface of the window glass 11 can be the touch area 11*r*.

The touch area 11*r* of the window glass 11 may be corresponding to the display area 10*r* of the display apparatus 10. For example, the touch area 11*r* may have a plurality of subareas (or locations), and each subarea of the touch area 11*r* may be corresponding to one or more light emitting pixels (or locations) of the display area 10*r*.

In some embodiments, the camera device 12 may be configured to scan the window glass 11. For example, the camera device 12 may capture information (such as electrical information or optical information) of the invisible light come from the window glass 11. For example, the camera device 12 may scan the window glass 11 to obtain information of the invisible light come from the window glass 11. In some embodiments, the camera device 12 may be configured to scan the window glass 11 only when the visible light source of the display apparatus 10 is turned on. For example, the camera device 12 may be configured to turn off automatically when the visible light source of the display apparatus 10 is turned off. For example, the camera device 12 may be configured to turn off automatically when there is no content shown on the screen 10*d*.

In some embodiments, the information of the invisible light may include, for example but not limited thereto, brightness, power, spectrum, patterns, distribution, frequency, gain or the combination thereof.

In some embodiments, the information of the invisible light may be retrieved by the processor 13 electrically connected to the camera device 12 for being further processed. In some embodiments, the processor 13 may determine if one or more light emitting pixels of the display area 10*r* are touched based on the information of the invisible light.

In some embodiments, the processor 13 may dynamically process the information of the invisible light and generate real time touching information of the window glass 11. For example, the real time touching information of the window glass 11 may be an input. The display apparatus 11 may respond to the input, such as change contents (e.g., UI) thereof.

In some comparative embodiments, a touch film or a proximity sensor may be provided on the display area, which may adversely affect user's experience and may be high-cost.

An object of the present disclosure is to provide a system and a method allowing detecting user's input. The present disclosure provides a touch area (such as the touch area 11*r* in FIG. 1) on the front side of a display area (such as the display area 10*r* in FIG. 1) and detecting user's input by invisible light (such as the invisible light L2) reflected from the touch area. In comparison with the above comparative embodiments, the present disclosure is relatively low-cost. Besides, since the touch area is spaced apart from the display area, the UI won't be affected and the installation of the touch system is simple.

Figure 4A:
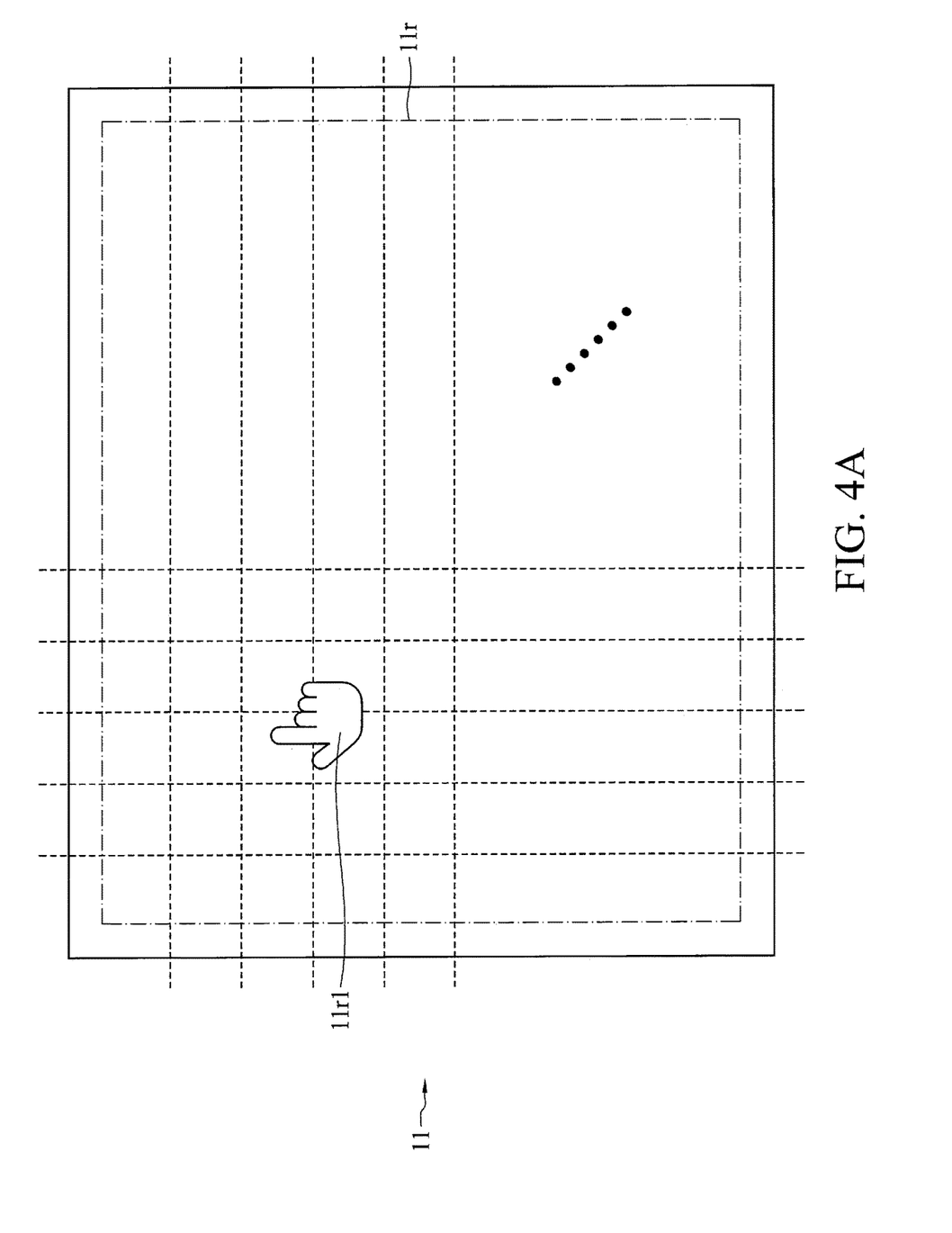
FIG. 4A is a top view of a window glass, in accordance with an embodiment of the present disclosure.
Figure 4B:
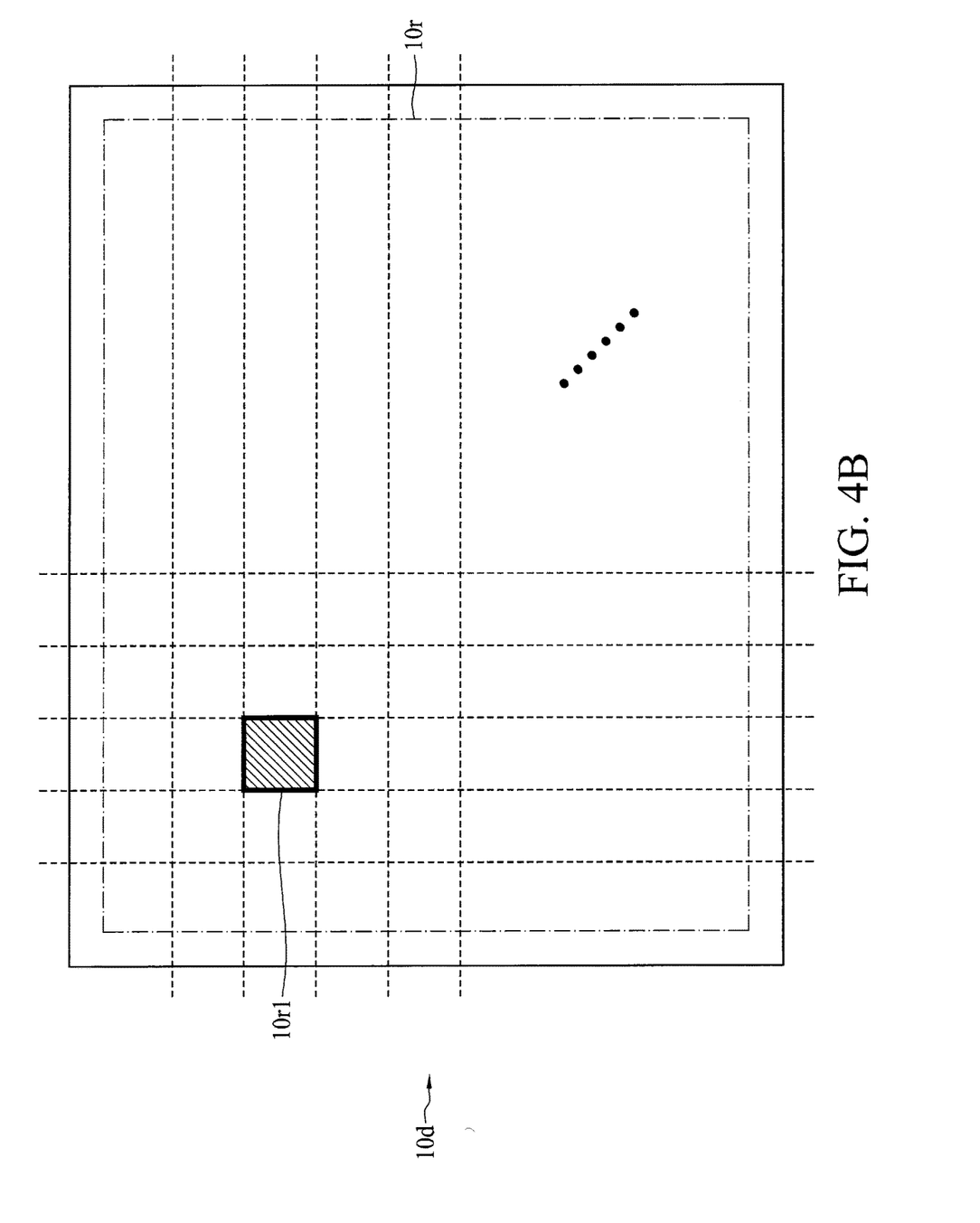
FIG. 4B is a top view of a screen, in accordance with an embodiment of the present disclosure.

Referring to FIG. 4A and FIG. 4B, FIG. 4A is a top view of the window glass 11, in accordance with an embodiment of the present disclosure. FIG. 4B is a top view of the screen 10*d*, in accordance with an embodiment of the present disclosure. In some embodiments, the top view of the window glass 11 in FIG. 4A may be the left side of the window glass 11 in FIG. 1.

As shown in FIG. 4A, the touch area 11*r* is indicated by dotted line. In some embodiments, the touch area 11*r* may be a virtual area. For example, the touch area 11*r* may not have a visible boundary line on the window glass 11. The other area of the window glass 11 (such as the area outside of the touch area 11*r*) may be an invalid touch area (not labelled in the figures). In some embodiments, as mentioned, the whole surface of the window glass 11 can be the touch area 11*r*.

The touch area 11*r* may be divided into a plurality of subareas (such as the subarea 11*r*1) or locations by a processor (e.g., the processor 13 in FIG. 1).

In some embodiments, the subareas of the touch area 11*r* may be virtual areas, and may not have a visible boundary line. Therefore, the subareas of the touch area 11*r* are indicated by a plurality of dotted lines. In some embodiments, the subareas of the touch area 11*r* may include lattices arranged in a periodic pattern. However, the arrangements of the subareas of the touch area 11*r* may be adjusted according to design requirements and is not limited to the specific embodiments illustrated in the figures.

As shown in FIG. 4B, the display area 10*r* is indicated by dotted line. In some embodiments, the display area 10*r* may be a virtual area. For example, the display area 10*r* may not have a visible boundary line on the screen 10*d*. In some embodiments, as mentioned, the whole surface of the screen 10*d* can be the display area 10*r*.

The display area 10*r* includes a plurality of subareas (such as the subarea 10*r*1) or locations. In some embodiments, the plurality of subareas of the display area 10*r* may include or correspond to one or more light emitting pixels (such as the light emitting pixels 10*p* in FIG. 2). In some embodiments, each subarea of the touch area 11*r* may be corresponding to one or more subareas of the display area 10*r*.

In some embodiments, invisible light may be emitted toward subarea of the touch area 11*r* configured to receive a user's touch. In some embodiments, invisible light may be emitted toward each subarea of the touch area 11*r*. In some embodiments, invisible light may be emitted by an invisible light source (e.g., the light source 10*a* in FIG. 1).

A camera device (e.g., the camera device 12 in FIG. 1) may scan the plurality of subareas of the touch area 11r and detect the invisible light reflected from one or more of the subareas of the touch area 11r. Then a processor (e.g., the processor 13 in FIG. 1) may determine if one or more of the subarea of the display area 10r are touched based on the detected invisible light.

For example, a user's finger touches the subarea 11r1 of the touch area 11r, which is corresponding to the subarea 10r1 of the display area 10r. The invisible light emitted toward the subarea 11r1 is reflected by the user's finger and detected by the camera device.

In some embodiments, the processor retrieves the information of the invisible light, and determines if the information of the invisible light exceeds a threshold. If the information of the invisible light exceeds a threshold, then the processor determines that the subarea 10r1 of the display area 10r is touched.

Figure 5:
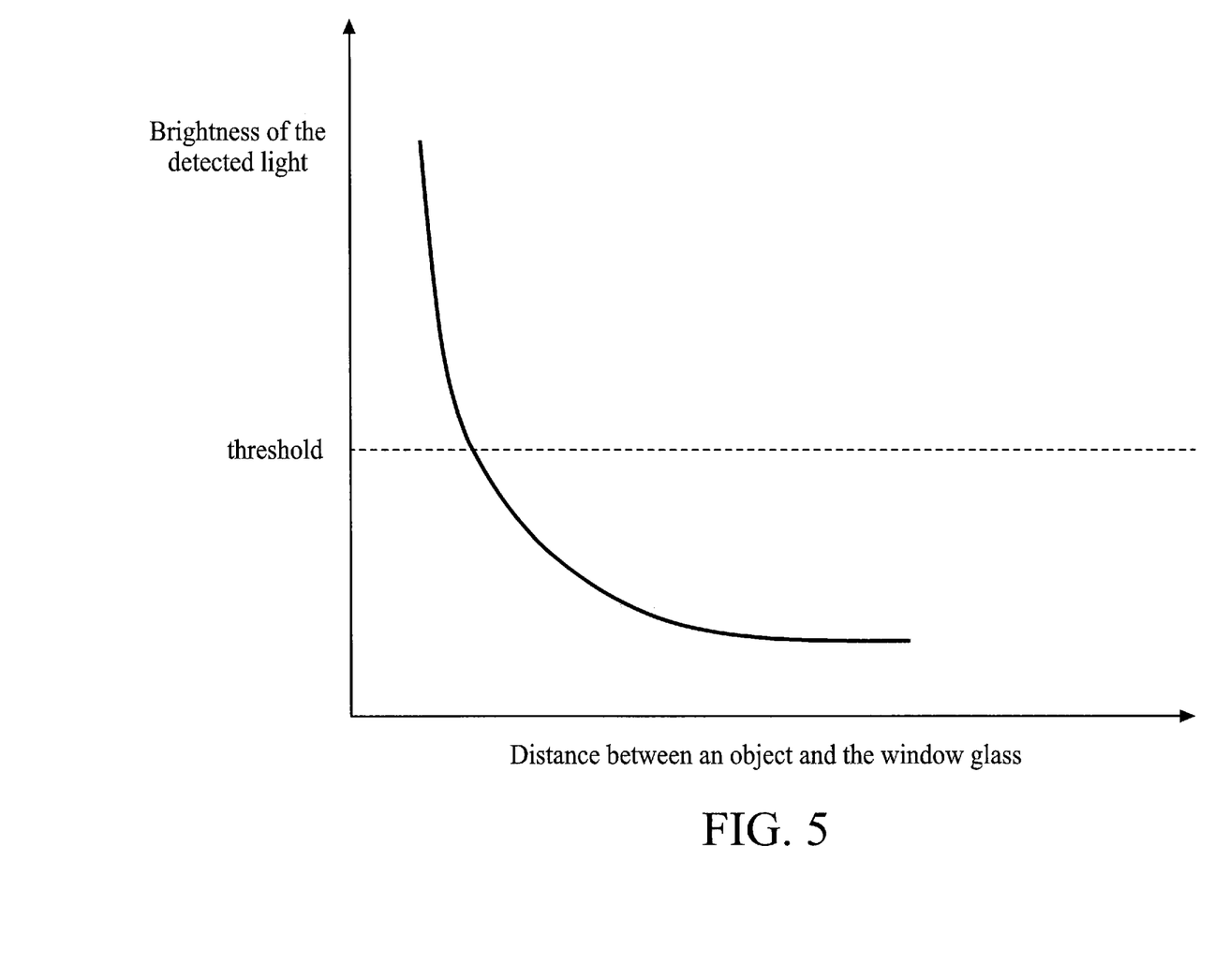
FIG. 5 shows a profile of brightness versus distance of a touch system, in accordance with some embodiments of the present disclosure.

Referring to FIG. 5, FIG. 5 shows a profile of brightness versus distance, in accordance with some embodiments of the present disclosure.

In some embodiments, the distance may be the distance between an object (such as a user's finger) and a window glass (e.g., the window glass 11 in FIG. 1). In some embodiments, the brightness may be the brightness of the detected light (e.g., the invisible light L2 in FIG. 1).

In some embodiments, if the distance is short enough such that the brightness exceeds a threshold, the camera device (e.g., the camera device 12 in FIG. 1) may obtain a relatively bright spot on the touched subarea of the touch area (such as the subarea 11r1 of the touch area 11r). The processor (e.g., the processor 13 in FIG. 1) may determine that the corresponding subarea of the display area (such as the subarea 10r1 of the display area 10r) is touched.

Figure 6:
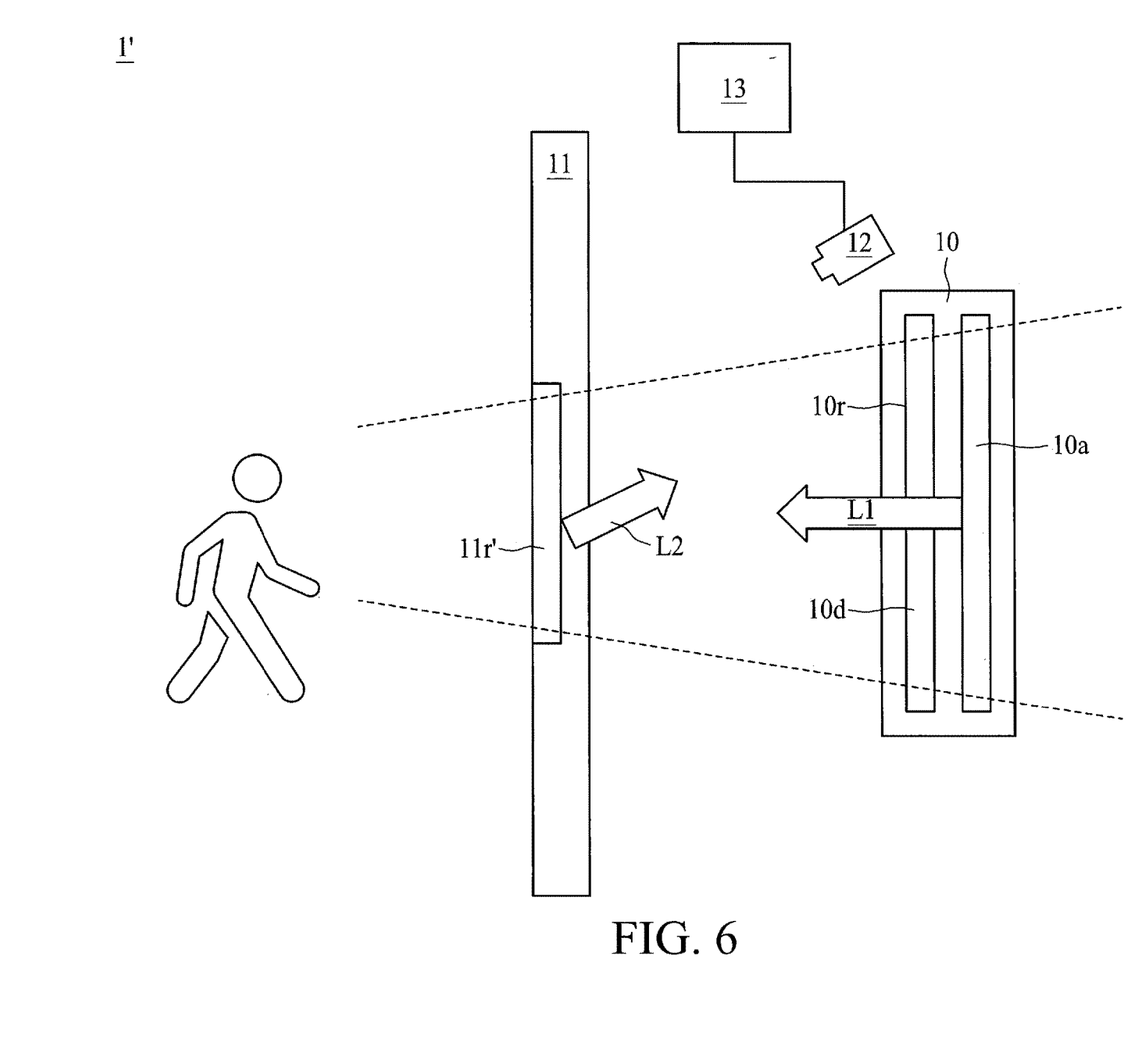
FIG. 6 is a cross-sectional view of a touch system, in accordance with an embodiment of the present disclosure.

Referring to FIG. 6, FIG. 6 is a cross-sectional view of a touch system 1', in accordance with an embodiment of the present disclosure. The touch system 1' in FIG. 6 is similar to the touch system 1 in FIG. 1, and the differences therebetween are described below.

The window glass 11 of the touch system 1' has a touch area 11r', which is relatively small with respect to the display area 10r of the display apparatus 10. The subareas of the touch area 11r may also be relatively small with respect to the subareas of the display area 10r.

In some embodiments, the processor 13 may determine if one or more light emitting pixels of the display area 10r are touched based on the information of the invisible light and also based on the relative scale between the touch area 11r' and the display area 10r.

Figure 7:
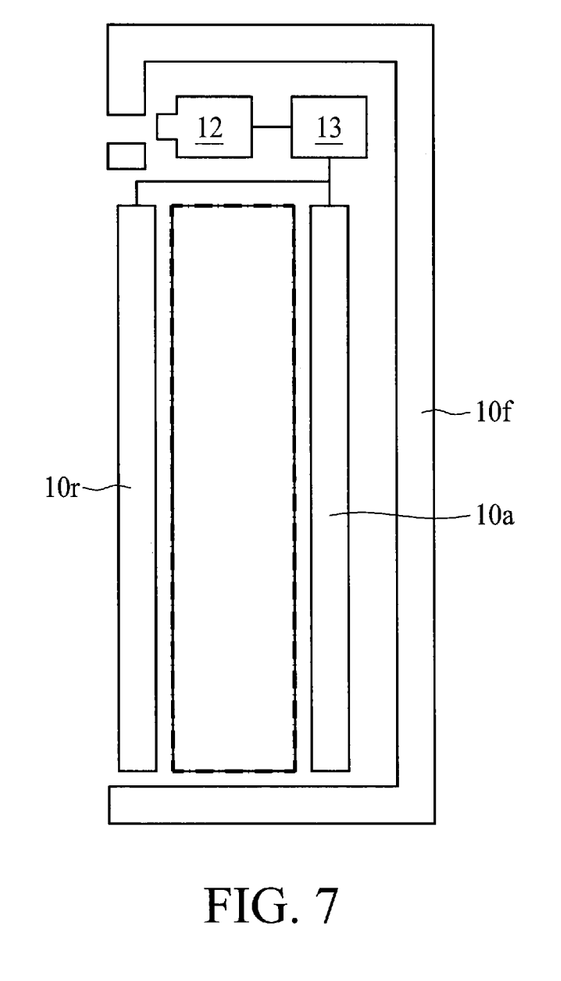
FIG. 7 is a cross-sectional view of a portion of a touch system, in accordance with an embodiment of the present disclosure.

Referring to FIG. 7, FIG. 7 is a cross-sectional view of a portion of a touch system, in accordance with an embodiment of the present disclosure. In some embodiments, the touch system 1 in FIG. 1 can be arranged as the configuration in FIG. 7.

In FIG. 7, the camera device 12 and the processor 13 are arranged inside of a frame 10f of the display apparatus (such as the display apparatus 10 in FIG. 1). The camera device 12 and the processor 13 are disposed on top of the light source 10a.

Figure 8:
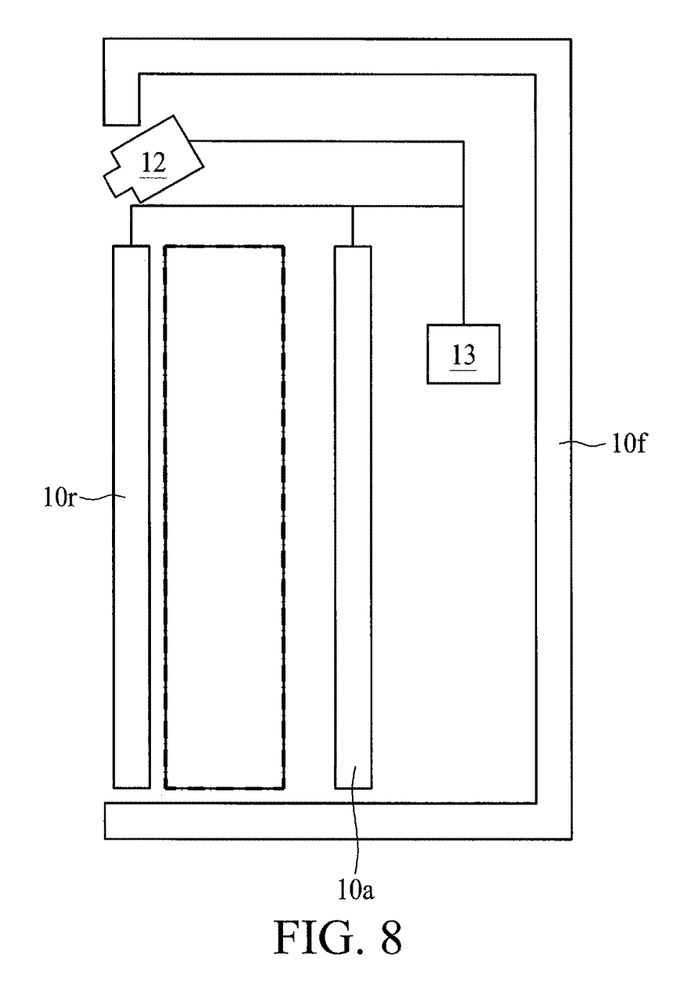
FIG. 8 is a cross-sectional view of a portion of a touch system, in accordance with an embodiment of the present disclosure.

Referring to FIG. 8, FIG. 8 is a cross-sectional view of a portion of a touch system, in accordance with an embodiment of the present disclosure. In some embodiments, the touch system 1 in FIG. 1 can be arranged as the configuration in FIG. 8.

In FIG. 8, the processor 13 is disposed behind the light source 10a. In some embodiments, the touch system 1 in FIG. 1 can be arranged to any configuration, and the present disclosure is not limited to the specific embodiments illustrated in the figures.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. When referring to numerical values or characteristics as "substantially" the same, the term can refer to the values lying within ±10%, ±5%, ±1%, or ±0.5% of an average of the values.

The foregoing outlines features of several embodiments and detailed aspects of the present disclosure. The embodiments described in the present disclosure may be readily used as a basis for designing or modifying other processes and structures for carrying out the same or similar purposes and/or achieving the same or similar advantages of the embodiments introduced herein. Such equivalent constructions do not depart from the spirit and scope of the present disclosure, and various changes, substitutions, and alterations may be made without departing from the spirit and scope of the present disclosure.

What is claimed is:

1. A touch system, comprising:
   a window glass having a touch area, wherein a plurality of subareas are defined on the touch area;
   a display apparatus spaced apart from the window glass, wherein the display apparatus includes a screen having a display area corresponding to the touch area of the window glass, a backlight configured to emit a visible light toward the screen, and a planar invisible light source configured to emit a first invisible light toward the touch area of the window glass, wherein the planar invisible light source is integrated in the backlight;
   a camera device configured to detect a second invisible light reflected from a subarea of the plurality of subareas; and
   a processor electrically connected to the camera device and configured to retrieve an electrical information of the detected second invisible light,
   wherein the processor determines that a position on the display area corresponding to the subarea of the plurality of subareas is touched in response to the electrical information of the detected second invisible light exceeds a threshold;

wherein the window glass is physically separated from the display apparatus; and wherein the camera device is arranged close to peripheral of the display apparatus and between the window glass and the display apparatus in a side view of the touch system.

2. The touch system of claim 1, wherein the backlight includes a plurality of light emitting elements for emitting the visible light, and the planar invisible light source is disposed spaced apart from the plurality of light emitting elements.

3. The touch system of claim 1, wherein the camera device is arranged on a frame of the display apparatus.

4. The touch system of claim 1, wherein the camera device is disposed inside of a frame of the display apparatus.

5. The touch system of claim 1, wherein the processor is disposed inside of a frame of the display apparatus.

6. The touch system of claim 1, wherein the electrical information of the second invisible light includes at least one of brightness, power, spectrum, patterns, distribution, frequency, and gain of the second invisible light.

7. The touch system of claim 1, wherein the first invisible light and the second invisible light include infrared radiation.

8. The touch system of claim 1, wherein the display apparatus further includes a frame enclosing the screen, the backlight, the planar invisible light source, the camera device, and the processor; wherein the frame includes a surface facing the window glass; and wherein the surface of the frame defines a first opening exposing at least a part of the display area of the screen and a second opening exposing at least a part of the camera device.

9. A touch system, comprising:

a window glass;

a display apparatus spaced apart from the window glass, wherein the display apparatus includes a screen, a backlight configured to emit a visible light toward the screen, and an invisible light source configured to emit an invisible light toward the window glass, wherein the invisible light source is integrated in the backlight;

a camera device configured to capture one or more optical information of the window glass; and a processor electrically connected to the camera device and configured to determine whether a first position on the window glass corresponding to a second position on the display apparatus is touched based on the one or more optical information of the window glass, and the first position on the window glass is space apart from the second position on the display apparatus;

wherein the window glass is physically separated from the display apparatus;

wherein the camera device is arranged close to peripheral of the display apparatus and between the window glass and the display apparatus in a side view of the touch system.

10. The touch system of claim 9, wherein the camera device is configured scan the window glass only when the backlight is turned on.

11. The touch system of claim 9, wherein the camera device is configured to scan a plurality of subareas on the window glass, and detect invisible light reflected from each subarea of the plurality of subareas.

12. The touch system of claim 9, wherein the processor is configured to dynamically process the one or more optical information and generates real time touching information of the window glass.

13. The touch system of claim 9, wherein the display apparatus further includes a frame enclosing the screen, the backlight, the invisible light source, the camera device, and the processor; wherein the frame includes a surface facing the window glass; and wherein the surface of the frame defines a first opening exposing at least a part of the screen and a second opening exposing at least a part of the camera device.

14. A method of operating a touch system with a window glass comprising a touch area divided into a plurality of subareas, comprising:

emitting an invisible light toward the touch area of the window glass through a screen of a display apparatus;

capturing one or more optical information of the window glass from a reflected invisible light, without passing through the screen of the display apparatus, from the touch area of the window glass; and determining a corresponding position on a display apparatus physically separated from the window glass based on the one or more optical information of the window glass.

15. The method of claim 14, wherein the optical information includes at least one of brightness, power, spectrum, patterns, distribution, frequency, and gain of a second invisible light.

* * * * *